United States Patent Office 2,860,115
Patented Nov. 11, 1958

2,860,115

COMPOSITION COMPRISING POLYETHYLENE PLASTIC AND ORGANIC PHOSPHITE AND METHOD FOR MAKING SAME

Arthur C. Hecker, Richmond Hill, and William E. Leistner, Brooklyn, N. Y., assignors to Argus Chemical Corporation, a corporation of New York No Drawing. Application June 6, 1955
Serial No. 513,598

7 Claims. (Cl. 260—23)

This invention relates to polyethylene plastic and the process of making it.

In processing polyethylene resin at the elevated temperatures normally used in making plastic products, the resin becomes tacky. The tackiness causes difficulties due to adherence to molds, calenders, extruders, or other heated metallic equipment. To decrease this tack or sticking of the polyethylene plastics, there have been incorporated heretofore internal lubricants such as zinc stearate. Such materials are effective for a short period of processing time only. It is customary to add additional portions of zinc stearate or the like when the effect of the initial addition disappears and sticking difficulties reappear. There is a limit, however, to the total amount that may be so introduced. Excessive proportions of the internal lubricant result in exudation when the compounded plastic is cooled.

Also, the finished polyethylene products are subject to deterioration on exposure to light and air, to a product that is brittle on cooling.

Various stabilizers have been proposed for decreasing this development of brittleness. These stabilizers do not overcome the tackiness at compounding or shaping temperatures. Some of the stabilizers increase discoloration of the polyethylene resin at elevated temperatures.

This invention provides a polyethylene plastic including a component that is both an anti-tack agent and a stabilizer against development of brittleness on exposure to light and air or oxygen.

The invention comprises the process of and the product resulting from compounding polyethylene with an organic phosphite. In one embodiment, the invention comprises the introduction of the phosphite and an internal lubricant.

The polyethylene resin used is any solid polyethylene. Such a solid resin is subject to softening to workable or compounding condition when warmed to a temperature between about 220° and 440° F.

Examples of such solid polyethylene resins that we have used to advantage are those known as Solvay AC-615 and AC-617, du Pont Polyethylene CS-300, and Polyethylene DYNH. The latter is understood to have a molecular weight around 40,000 and the other polyethylenes molecular weights of the order of 4,000–8,000.

As the organic phosphite component, we use a substantially non-volatile phosphite that, in the minor proportion used, is soluble in the polyethylene at elevated temperatures of softening and non-separating therefrom at temperatures down to those of winter, as to —60° F. or so. Phosphites that meet the requirements and illustrate the class to be used are the trialkyl, triaryl, and triarylalkyl phosphites. Examples are tributyl, trioctyl, tridodecyl, trioctadecyl, triphenyl tricresyl, tribenzyl, trinonylphenyl, phenyl dioctyl, butyl dicresyl, or octyl dioctylphenyl phosphite.

The phosphites are of the type formula

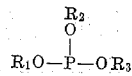
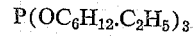

where $R_1$, $R_2$ and $R_3$ are each individually selected from the group consisting of alkyl, aryl, alkaryl and aralkyl groups. Thus tri-2-ethylhexyl phosphite is $$P(OC_6H_{12}.C_2H_5)_3$$

When an internal lubricant also is incorporated, it is one of the conventional ones. Suitably it is one melting at temperatures of compounding polyethylene plastics, as, for instance, a polyvalent metal soap. Examples of such soaps of the desired low melting point are zinc and cadmium laurate, palmitate, or stearate.

As to proportions, our anti-tack and stabilizer component is effective in proportions as low as 0.05–0.1 part for 100 parts of polyethylene. We may use proportions ranging from this minimum up to 5 parts for 100 of the polyethylene. Proportions above 5 parts are unnecessary for anti-tack and stabilizer functions. Such larger proportions are, therefore, uneconomical. In general, the proportion of the phosphite used is larger, within the range stated, the higher the molecular weight of the phosphite selected.

The proportion of the polyvalent metal soap when used is about 0.5 part for 100 parts of the polyethylene. This corresponds to about 0.5 part of the soap for 0.05–0.5 part of the selected phosphite.

The selected materials are compounded, that is, mixed under conditions and in equipment that are conventional for compounding polyethylene plastics. Thus, the polyethylene may be warmed to the softening temperature, milled on differential speed, heated rollers, and formed into a continuous band. Then the organic phosphite is introduced, as by spraying on and continuing the milling, to provide the anti-tack and stabilizer component. A metallic stearate, if it is to be used, is also introduced at this stage. The whole composition is then further milled and mixed for a few minutes. The resulting hot plastic is then sheeted off.

For test purposes a portion of the sheet thus formed is placed in a 6" x 6" x 0.04" mold. A slab is molded at 350° F., at a pressure of 1,000 p. s. i., for 5 minutes. The molded specimen is then cooled to 100° F., the pressure released and the slab so formed is removed.

In testing the polyethylene plastic so molded, the specimen is exposed to ultraviolet light and air in a weatherometer, in this case Model XW operating at a black panel temperature of 125° F. Sections of the plastic undergoing test are removed at intervals and tested for the lowest temperature at which the slabs, upon severe cooling, do not show brittleness on bending. This "brittleness temperature" is determined essentially according to ASTM Specification D746–52T. It is the lowest temperature at which half of the exposed specimens do not crack when the tests are made at 10° intervals. When the brittleness temperature is +30° F., for example, half at least of the samples did not crack at 30° but did crack on the next test at 20° F.

The invention will be further illustrated by description in connection with the following specific examples of the practice of it. In these examples and elsewhere herein proportions are expressed as parts by weight unless specifically stated to the contrary.

Example 1

The general procedure of compounding and testing described above is employed with polyethylene DYNH, the temperature of the mixing rolls being 310° F.

Trioctyl phosphite, i. e. tri-2-ethylhexyl phosphite, was used as the anti-tack and stabilizer component in various proportions. Zinc stearate, as internal lubricant, was introduced in constant amount in the several preparations.

The compositions and test results therewith are tabulated below:

| Material | Parts by Weight | | | |
|---|---|---|---|---|
| DYNH | 100 | 100 | 100 | 100 |
| Zinc stearate | 0.5 | 0.5 | 0.5 | 0.5 |
| Trioctyl phosphite | 0 | 0.1 | 0.5 | 2.0 |
| Discoloration in milling | None | None | None | None |

BRITTLENESS TEMPERATURE, °F., AFTER EXPOSURE IN WEATHEROMETER

| For 285 hrs | +30 | −60 | −50 | −60 |
|---|---|---|---|---|
| For 375 hrs | above +30 | −50 | −60 | −60 |
| For 480 hrs | above +30 | −40 | −50 | −60 |

*Example 2*

The procedure of Example 1 was followed except that the phosphite used was triphenyl phosphite. The proportions of the triphenyl phosphite for 100 of the polyethylene resin and the lowest temperature at which the test strips were not brittle are as follows:

PARTS OF TRIPHENYL PHOSPHITE

| 0.5 | 1 | 2 |
|---|---|---|

BRITTLENESS TEMPERATURE AFTER 500 HOURS IN WEATHEROMETER

| −50° | −60° | −60° |
|---|---|---|

*Example 3*

The procedure of Example 1 is followed except that the zinc stearate is omitted.

It was noted that release from the mill rolls was not quite as good as when the zinc stearate was present. However, release was sufficient for processing and prolonged processing developed no additional tack development.

| Material | Parts by Weight | | | |
|---|---|---|---|---|
| DYNH | 100 | 100 | 100 | 100 |
| Trioctyl phosphite | 0 | 0.1 | 0.5 | 2.0 |

BRITTLENESS TEMPERATURE AFTER EXPOSURE IN WEATHEROMETER

| 285 hrs | +30 | −60 | −60 | −60 |
|---|---|---|---|---|
| 375 hrs | above +30 | −50 | −60 | −60 |
| 480 hrs | above +30 | −40 | −50 | −60 |

This shows that the phosphite and not the zinc stearate is the cause of the favorable brittleness temperature.

*Example 4*

The procedures of Examples 1, 2, and 3 are followed except that the organic phosphite there used is replaced in turn by an equal weight of each of the other organic phosphites disclosed herein.

In general, the compounds containing the added phosphite do not adhere to the heated processing equipment during the compounding operations. Without the phosphite being present, the polyethylene composition shows tack and sticks badly to the equipment. Use of the zinc stearate or like internal lubricant alone only delays the development of tack for a finite period of time at the best.

Once these results have been observed, various theories may be advanced to explain the mechanism by which the desirable effects are produced. We consider that our additive prevents the development of tackiness by decreasing the cleavage of the polyethylene molecules on heating to molecules of lower weight, lower melting point, and therefore, greater tendency to tackiness at a given elevated temperature. We consider the action of our organic phosphites as stabilizers to be due in part to their effect in decreasing cross linking during exposure in the weatherometer or under like conditions, such cross linking unless prevented or restricted resulting in brittleness of the product at low temperatures.

It will be understood that it is intended to cover all changes and modifications of the examples of the invention herein chosen for the purpose of illustration which do not constitute departures from the spirit and scope of the invention.

What we claim is:

1. A plastic composition comprising solid polyethylene and admixed therein an organic phosphite that is soluble in the polyethylene at the elevated temperature of softening thereof and at temperatures down to −60° F., the phosphite serving as an anti-tack agent and a stabilizer and having the formula:

$$R_1O-P(OR_3)-OR_2$$ 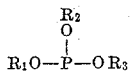

in which $R_1$, $R_2$ and $R_3$ are each individually selected from the group consisting of alkyl, aryl, alkaryl and aralkyl groups.

2. The composition of claim 1, the phosphite being tri-2-ethylhexyl phosphite.

3. The composition of claim 1, the phosphite being triphenyl phosphite.

4. The composition of claim 1 which includes an admixed polyvalent metal soap that is an internal lubricant for polyethylene and melts at a temperature as low as about 220° F.

5. In making a polyethylene plastic that is substantially non-tacky at elevated compounding temperatures and is resistant to development of brittleness on exposure to light and oxygen, the process which comprises compounding normally solid polyethylene at the temperature of softening thereof to workable condition with an organic phosphite having the formula:

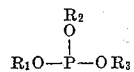

in which $R_1$, $R_2$ and $R_3$ are each individually selected from the group consisting of alkyl, aryl, alkaryl and aralkyl groups; in the proportion of 0.05 to 5 parts by weight for 100 of the polyethylene and then cooling the resulting compounded plastic, the phosphite being soluble in the polyethylene at the elevated temperature of softening thereof and at temperatures down to −60° F.

6. In making a polyethylene plastic that is substantially non-tacky at elevated compounding temperatures and resistant to development of brittleness on exposure to light and oxygen, the process which comprises compounding normally solid polyethylene, at the temperature of softening thereof, with (1) a polyvalent metal soap that is an internal lubricant for polyethylene and melts at the temperature of compounding the polyethylene plastic, and (2) an organic phosphite having the formula:

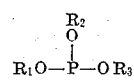

in which $R_1$, $R_2$ and $R_3$ are each individually selected from the group consisting of alkyl, aryl, alkaryl and aralkyl groups, in the proportion of 0.05 to 5 parts by weight for 100 of the polyethylene and then cooling the resulting compounded plastic, the phosphite being soluble in the polyethylene at the elevated temperature of softening thereof at at temperatures down to −60° F.

7. A polyethylene plastic compounding component consisting essentially of an organic phosphite having the formula:

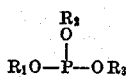

in which $R_1$, $R_2$ and $R_3$ are each individually selected from the group consisting of alkyl, aryl, alkaryl and aralkyl groups the phosphite being soluble in the polyethylene at the elevated temperature of softening thereof and at temperatures down to $-60°$ F., and a polyvalent metal soap that is an internal lubricant for polyethylene and melts at the temperature of compounding the polyethylene plastic, the proportions being 0.05–5 parts of the phosphite for 0.5 part of the soap.

References Cited in the file of this patent

UNITED STATES PATENTS

| | | |
|---|---|---|
| 2,419,354 | Howland et al. | Apr. 22, 1947 |
| 2,435,245 | Strain | Feb. 3, 1948 |
| 2,480,296 | Burk | Aug. 30, 1949 |
| 2,562,803 | Mankowich | July 31, 1951 |
| 2,676,945 | Higgins | Apr. 27, 1954 |
| 2,726,226 | Werkheiser | Dec. 6, 1955 |
| 2,727,879 | Vincent | Dec. 20, 1955 |
| 2,733,226 | Hunter | Jan. 31, 1956 |

OTHER REFERENCES

Du Pont: "Polyethylene," E. I. Du Pont de Nemours & Co., Plastics Department, Arlington, N. J., April 6, 1946, page 27.

UNITED STATES PATENT OFFICE
CERTIFICATE OF CORRECTION

Patent No. 2,860,115                                                    November 11, 1958

Arthur C. Hecker et al.

It is hereby certified that error appears in the printed specification of the above numbered patent requiring correction and that the said Letters Patent should read as corrected below.

Column 1, line 23, for "lubrcants" read -- lubricants --; column 2, line 10, for "lubrcant" read -- lubricant --; column 3, line 17, in the table, opposite "For 285 hrs.", third column, for "-50" read -- -60 --; column 4, line 74, for "at", first occurrence, read -- and --.

Signed and sealed this 3rd day of February 1959.

(SEAL)

Attest:

KARL H. AXLINE                                                  ROBERT C. WATSON

Attesting Officer                                            Commissioner of Patents